United States Patent
Takamatsu et al.

(10) Patent No.: US 9,669,759 B2
(45) Date of Patent: Jun. 6, 2017

(54) IN-VEHICLE DEVICE

(71) Applicant: Yazaki Corporation, Tokyo (JP)

(72) Inventors: Masahiro Takamatsu, Makinohara (JP); Tai Inoue, Makinohara (JP); Masahide Nagata, Makinohara (JP); Takayuki Ogawa, Makinohara (JP); Gosei Sato, Makinohara (JP); Takao Kanai, Makinohara (JP)

(73) Assignee: Yazaki Corporation, Tokyo (JP)

( * ) Notice: Subject to any disclaimer, the term of this patent is extended or adjusted under 35 U.S.C. 154(b) by 6 days.

(21) Appl. No.: 14/851,103

(22) Filed: Sep. 11, 2015

(65) Prior Publication Data

US 2016/0075279 A1 Mar. 17, 2016

(30) Foreign Application Priority Data

Sep. 12, 2014 (JP) ................................. 2014-186219
Sep. 12, 2014 (JP) ................................. 2014-186220

(51) Int. Cl.
B60Q 9/00 (2006.01)
G06F 3/00 (2006.01)
H04N 5/225 (2006.01)
H04N 5/232 (2006.01)

(52) U.S. Cl.
CPC ............... *B60Q 9/00* (2013.01); *G06F 3/005* (2013.01); *H04N 5/2252* (2013.01)

(58) Field of Classification Search
CPC ........ B60Q 9/00; G06F 3/005; H04N 5/2252; H04N 5/23229

USPC ........................................................ 701/36
See application file for complete search history.

(56) References Cited

U.S. PATENT DOCUMENTS

| | | | |
|---|---|---|---|
| 2006/0201077 A1 | 9/2006 | Kamano et al. | |
| 2007/0176402 A1 | 8/2007 | Irie et al. | |
| 2007/0272837 A1 | 11/2007 | Yoshifuku et al. | |
| 2008/0068462 A1 | 3/2008 | Koumura | |
| 2008/0186701 A1 | 8/2008 | Omi | |
| 2009/0097701 A1* | 4/2009 | Nagai | A61B 5/18 382/100 |
| 2009/0115846 A1* | 5/2009 | Ohue | B60R 11/04 348/148 |

(Continued)

FOREIGN PATENT DOCUMENTS

| | | |
|---|---|---|
| JP | 6-8746 A | 1/1994 |
| JP | 2005-35409 A | 2/2005 |

(Continued)

OTHER PUBLICATIONS

Communication issued Sep. 13, 2016, issued by the Japanese Patent Office in counterpart Japanese Patent Application No. 2014-186220.

(Continued)

*Primary Examiner* — Yazan Soofi
(74) *Attorney, Agent, or Firm* — Sughrue Mion, PLLC

(57) ABSTRACT

An in-vehicle device includes a functional unit to be arranged at an instrument panel of a vehicle and configured to perform an operation toward a driver seat of the vehicle, and a blinding panel covering a front surface of the functional unit. A plurality of perforations is formed in the blinding panel to extend through the blinding panel in a thickness direction of the blinding panel.

17 Claims, 14 Drawing Sheets

(56) References Cited

U.S. PATENT DOCUMENTS

| | | | | |
|---|---|---|---|---|
| 2010/0007480 A1* | 1/2010 | Uozumi | ............... | A61B 5/18 340/436 |
| 2010/0182425 A1 | 7/2010 | Sakakida et al. | | |
| 2010/0214087 A1* | 8/2010 | Nakagoshi | ............... | A61B 5/18 340/436 |
| 2010/0220892 A1* | 9/2010 | Kawakubo | ............... | A61B 3/14 382/103 |
| 2012/0242819 A1* | 9/2012 | Schamp | ............... | G08B 21/06 348/78 |
| 2014/0043465 A1* | 2/2014 | Salomonsson | ............ | B60R 1/00 348/113 |
| 2015/0015713 A1* | 1/2015 | Wang | ............... | H04N 5/235 348/148 |
| 2016/0023620 A1* | 1/2016 | Matori | ............... | B60R 11/04 348/148 |
| 2016/0068103 A1* | 3/2016 | McNew | ............... | B60Q 9/00 701/23 |

FOREIGN PATENT DOCUMENTS

| | | |
|---|---|---|
| JP | 2007198929 A | 8/2007 |
| JP | 2007-316036 A | 12/2007 |
| JP | 2007316030 A | 12/2007 |
| JP | 2008-74146 A | 4/2008 |
| JP | 2008-207796 A | 9/2008 |
| JP | 2008-283562 A | 11/2008 |
| JP | 2010-203836 A | 9/2010 |
| JP | 201378969 A | 5/2013 |
| JP | 2013-200606 A | 10/2013 |

OTHER PUBLICATIONS

Communication issued Sep. 20, 2016, issued by the Japanese Patent Office in counterpart Japanese Patent Application No. 2014-186219.

* cited by examiner

IN-VEHICLE DEVICE

CROSS-REFERENCE TO RELATED APPLICATIONS

The present application claims priority from Japanese Patent Application Nos. 2014-186219 and 2014-186220 both filed on Sep. 12, 2014, the entire contents of which are incorporated herein by reference.

FIELD OF INVENTION

The present invention relates to an in-vehicle device.

RELATED ART

Related art examples for alarming or warning a driver include a speaker installed on a top surface of an instrument panel to emit sound, a display device fitted in the instrument panel to display a warning image, an in-vehicle camera installed on a top surface of the instrument panel or incorporated in a panel meter to capture images of a face of a driver, and a radar detector installed on the top surface of the instrument panel to warn the driver using a sound and light.

For example, a related art drive assist system displays a character on a display device installed in a vehicle compartment and presents various kinds of information to a driver through the character (see, e.g., JP2013-78969A).

Another related art is a vehicle interior camera system which monitors a vehicle compartment including rear seats by capturing images from various angles with multiple cameras installed in the vehicle compartment.

For example, a related art vehicle interior camera system has two camera units installed near an inner rear-view mirror disposed above a windshield of a vehicle. one of the camera units being installed to detect a driver sitting on a driver seat, and the other camera unit being installed to detect a passenger sitting on a front passenger seat (see, e.g., JP2007-316030A).

According to another related art, imaging devices are installed on ceiling portions located on the top-front side of the driver seat and the front passenger seat to capture images of a headrest, a seat back, or an airbag device and its peripheral area of each of the driver seat and the front passenger seat (see, e.g., JP2007-198929A).

However, conventional in-vehicle devices such as speakers, display devices, cameras, and radar detectors are exposed from the surface of an instrument panel and hence are low in appearance. In particular, as for in-vehicle cameras, a body that houses an imaging unit is exposed in its entirety.

Further, a camera exposed to an interior of a vehicle compartment causes the driver or a passenger to feel uncomfortable or pressured. This may be particularly serious in the case of a camera that is installed on the side of the rear seats. As described above, the installation of a camera lowers the appearance of the vehicle interior.

SUMMARY

Illustrative aspects of the present invention provide an in-vehicle device that provides a good appearance of a vehicle interior.

According to an illustrative aspect of the present invention, an in-vehicle device includes a functional unit to be arranged at an instrument panel of a vehicle and configured to perform an operation toward a driver seat of the vehicle, and a blinding panel covering a front surface of the functional unit. A plurality of perforations is formed in the blinding panel to extend through the blinding panel in a thickness direction of the blinding panel.

According to this configuration, when the in-vehicle device is installed at the instrument panel, a good appearance of the instrument panel can be provided.

The perforations may be inclined with respect to the thickness direction of the blinding panel to extend toward the driver seat. This prevents the in-vehicle device from being irradiated with sunlight entering through the windshield so that it is rendered less viewable from the driver or a passenger.

The functional unit may be configured to be housed in a recess formed in the instrument panel and the blinding panel may be configured to cover an opening of the recess. According to this configuration, light reflected from the in-vehicle device toward the windshield is blocked by the inner wall surface of the recess. Therefore, a hood for the in-vehicle device is not necessary and the flexibility of the design of the instrumental panel is improved.

The blinding panel may be attached to the front surface of the functional unit so as to be joined to the functional unit. This makes it possible to manufacture the in-vehicle device in a compact manner. Even if the in-vehicle device is made compact, the direction in which the operation is performed can be changed by changing the inclination directions of the perforations.

The functional unit may have an air blower configured to send air. In this example, the air blower installed in the instrument panel can be concealed. Since the air blower is concealed behind the blinding panel, a good appearance of the instrument panel can be ensured. Further, the air blowing direction can be adjusted by the perforations formed through the blinding panel.

The functional unit may have a camera configured and arranged to capture images of a region inside a vehicle compartment. In this example, the camera installed in the instrument panel can be concealed. Since the camera is concealed behind the blinding panel, a good appearance of the instrument panel can be ensured. Images can be taken by the concealed camera without being recognized by the driver or a passenger. Further, the camera and the air blower may be both concealed behind the blinding panel to operate in cooperation with each other.

The air blower may be arranged at a location on the instrument panel that faces a steering wheel of the vehicle and may be configured to send the air during a warning operation. With this configuration, it is possible to cause the air to hit the face or a portion near the face of the driver and to alarm the driver to let the driver become aware of the warning operation reliably.

The functional unit may further have a camera configured and arranged to capture an image of a region inside a vehicle compartment, wherein the air blower and the camera operate in cooperation with each other during the warning operation. With this configuration, it is possible to cause the driver to recognize the warning operation as a result of the cooperation of the air blower and the camera that are concealed behind the blinding panel.

Illustrative aspects of the present invention provide a vehicle interior camera system with which a driver or a passenger is less likely to notice the presence of one or more cameras installed in a vehicle compartment.

According to an illustrative aspect of the present invention, a vehicle interior camera system is configured to capture an image of an inside of a vehicle compartment. The vehicle interior camera system includes a camera installed in a wall of the vehicle compartment, and a blinding panel covering a front surface of the camera. A surface of the blinding panel forms a part of a surface of the wall. A plurality of perforations is formed in the blinding panel to allow light that comes from an imaging range of the camera toward the front surface of the camera to pass though the perforations.

According to this configuration, the camera is installed at the wall surface of the vehicle compartment. However, since the front surface of the camera is covered with the blinding panel, the driver or a passenger is less likely to notice the presence of the camera installed in the vehicle compartment. Therefore, although the camera is installed in the vehicle compartment, a similar atmosphere as in an ordinary vehicle compartment can be created and hence the driver or a passenger can be prevented from feeling uncomfortable or pressured.

The vehicle interior camera system may include a plurality of cameras described above and a plurality of blinding panels described above, covering the respective front surfaces of the cameras. In this example, although the plurality of cameras is installed in the wall of the vehicle compartment, the front surfaces of the cameras are covered with the respective blinding panels. Thus, the driver or a passenger is less likely to notice the presence of the cameras installed in the vehicle compartment. Therefore, although multiple cameras are installed in the vehicle compartment, a similar atmosphere as in an ordinary vehicle compartment can be created.

The camera may be housed in a recess formed in the wall, and the blinding panel may cover an opening of the recess. According to this configuration, the driver or a passenger is even less likely to notice the presence of the camera.

The blinding panel may be attached to the front surface of the camera so as to be joined to the camera. With this configuration, a camera unit can be manufactured in a compact manner. Even if the camera unit is made compact, imaging can be performed such that an imaging range is determined by the inclination angles of the perforations.

The perforations may be formed such that an axial line of each of the perforations is inclined in a direction defining the imaging range. With this configuration, by adjusting the directions of the perforations of the blinding panel, taking images of unnecessary regions can be prevented to protect privacy.

The camera may be installed such that the imaging range covers an area of a rear seat inside the vehicle compartment. With this configuration, since images of the area of the rear seat can be taken by the a plurality of cameras installed in the wall of the vehicle compartment at a plurality of locations, the images can be used as evidential images at the occurrence of a crime in the vehicle compartment.

Other aspects and advantages of the invention will be apparent from the following description, the drawings and the claims.

DETAILED DESCRIPTION

Hereinafter, in-vehicle devices according to exemplary embodiments of the present invention will be described with reference to FIGS. 1A to 9. For example, an in-vehicle device is an in-vehicle unit installed in an instrument panel. The in-vehicle unit has a functional unit such as an air blower and an in-vehicle camera.

The in-vehicle device according to this exemplary embodiment of the invention is an in-vehicle unit having an air blower. Conventional in-vehicle devices installed in vehicles, such as digital tachographs and panel meters, perform a warning operation for arousing attention to, for example, a current driving state using an alarm sound or warning light.

However, though stimulating the auditory or visual sense of the driver, warning operations of conventional in-vehicle devices not much different from warnings that are used ordinarily and hence may not result in improvement of a driving state because the driver gets used to such a warning operation and comes not to do safe driving strictly even if he or she is aware of it.

The in-vehicle unit according to the exemplary embodiment is configured so as to perform a warning operation for, for example, arousing attention of the driver by causing the face etc. of the driver to be blown by air sent from an air blower so that the driver can feel the warning through his or her skin.

Figure 1A:
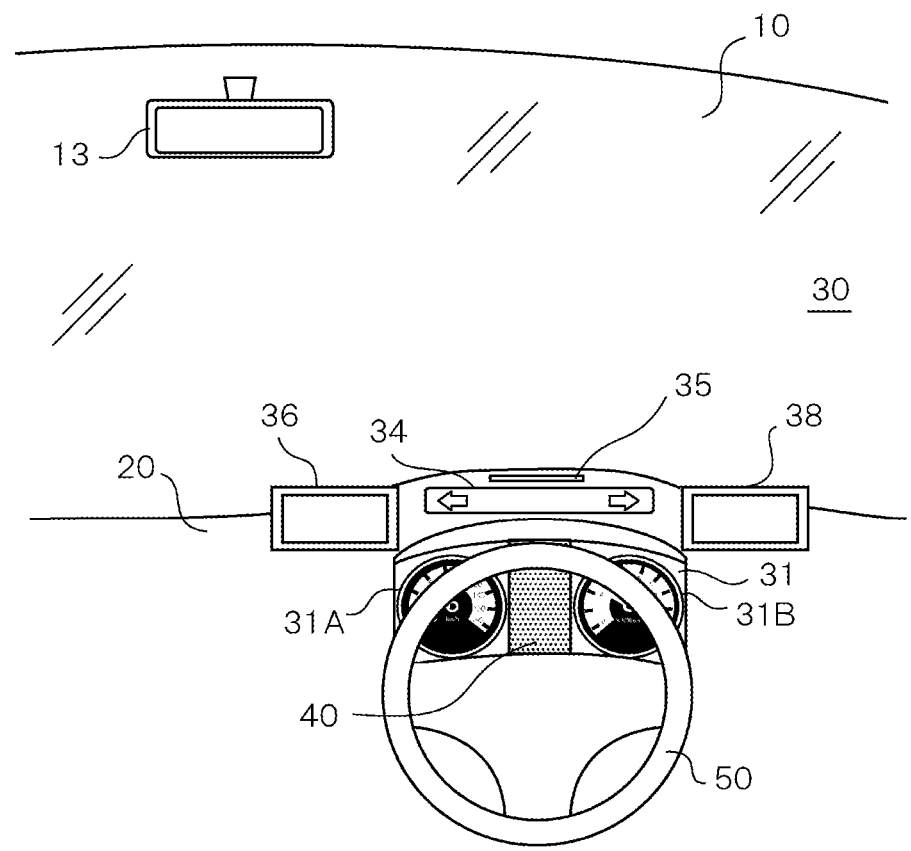
FIG. 1A is a front view illustrating an appearance of a vehicle instrument panel according to an exemplary embodiment of the present invention.

FIG. 1A is a front view illustrating an appearance of a vehicle instrument panel 20 and its peripheral area. In front of a driver seat, a windshield 10, an inner rear-view mirror 13, the instrument panel 20, various displays 30, a steering wheel 50 are disposed.

Figure 1B:
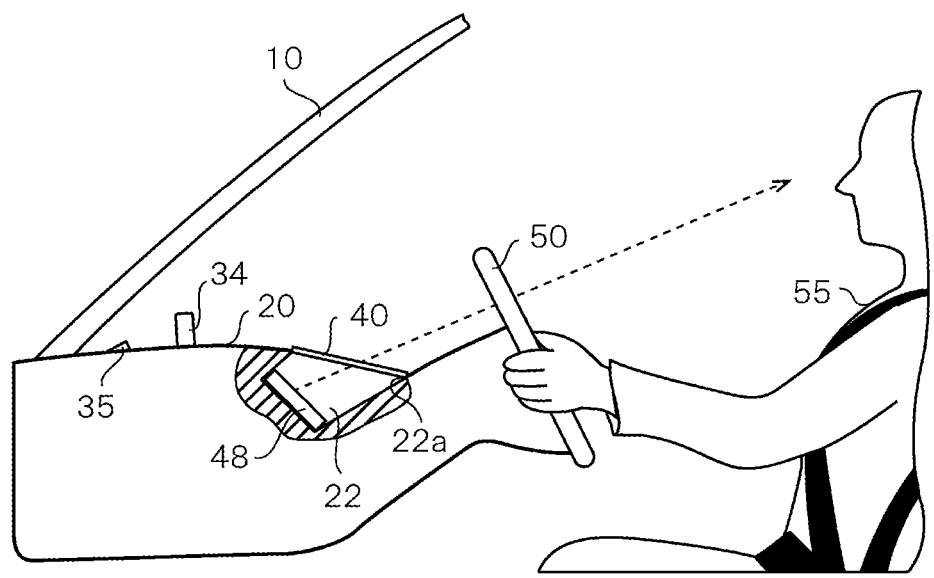
FIG. 1B is a partially sectional side view of a driver seat side of a vehicle compartment, illustrating the instrument panel and its peripheral area.

The various displays 30 are installed in the instrument panel 20, and part of the various displays 30 are disposed at such positions as to be seen easily from the driver 55 through the inside spaces of the steering wheel 50 (see FIG. 1B). A blinding panel 40 is disposed in the instrument panel 20 at a front-center position. As will be described later, the blinding panel 40 forms a part of an in-vehicle unit 45 (see FIG. 2A). Meter panels 31 such as a speedometer 31A and an engine tachometer 31B are disposed right on the two respective sides of the blinding panel 40.

A pair of liquid crystal displays 36 and 38 are also disposed on the two respective sides of the blinding panel 40. The liquid crystal displays 36 and 38 display such information as a battery voltage, a running distance, an engine rotation speed, and a remaining fuel amount.

A high-mount display 34 is disposed on the top surface of the instrument panel 20. The high-mount display 34 displays images of turn-signal indicators, for example. A headup display 35 for projecting an image onto the windshield 10 is disposed on the top surface of the instrument panel 20 at a position close to the windshield 10.

FIG. 1B is a partially sectional side view of the driver seat side of the vehicle compartment shown in FIG. 1A, illustrating the instrument panel 20 and its peripheral area. The instrument panel 20 is formed with an oblique recess 22 at a front-center position. An air blower 48 is disposed on the bottom surface of the recess 22. The blinding panel 40 is attached so as to cover an opening 22a of the recess 22.

Figure 2A:
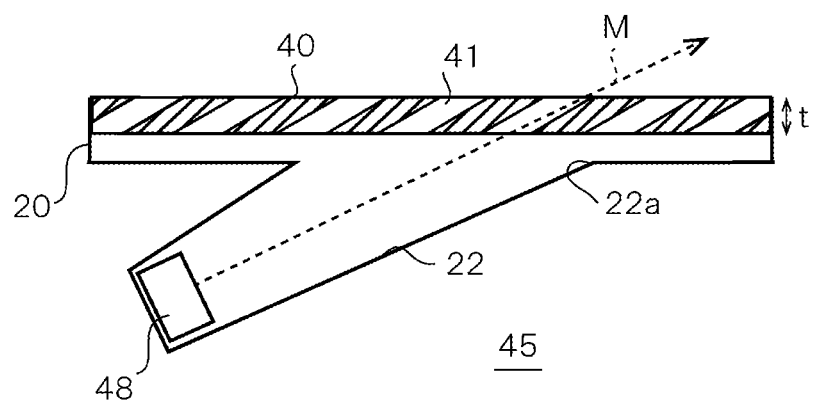
FIG. 2A shows the configuration of an in-vehicle unit which is installed in the instrument panel.

FIG. 2A shows the configuration of the in-vehicle unit 45. The in-vehicle unit 45 has the air blower 48 and the blinding panel 40. The air blower 48 is disposed on the bottom surface of the recess 22 which extends obliquely from the front surface of the instrument panel 20. FIG. 2A is drawn schematically to facilitate understanding of the description. The direction M of air sent from the air blower 48 is parallel with the inclination direction of the recess 22.

Figure 2B:
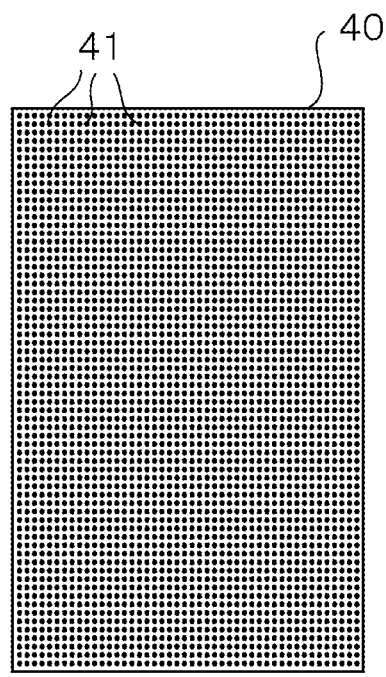
FIG. 2B shows the shape of a blinding panel which is attached to the instrument panel so as to cover an opening of a recess of the instrument panel.

FIG. 2B shows the shape of the blinding panel 40 which is attached to the instrument panel 20 so as to cover the opening 22a of the recess 22. Numerous perforations 41 are formed through the blinding panel 40 so as to have circular opening ends.

The blinding panel 40 is formed so that the air blower 48 which is housed in the recess 22 is not seen by the driver. In the exemplary embodiment, the blinding panel 40 is formed by shaping a metal material of aluminum, stainless steel, or a certain alloy or by molding a resin material such as acrylic or fiber-reinforced plastic.

The inner surfaces of the perforations 41 of the blinding panel 40 are inclined from its thickness direction so as to extend toward the driver seat to guide a wind produced by the air blower 48 to the face of the driver sitting on the driver seat. The inclination angle of the perforation 41 with respect to the thickness direction (thickness: t) of the blinding panel 40 increases as the position goes from the driver seat side to the windshield 10 side. The inclination angle of the perforation 41 may be equal to 0° in a surface portion, directed to the driver seat, of the blinding panel 40. That is, the term "inclined" includes a case that the inclination angle is equal to 0°.

The perforations 41 of the blinding panel 40 has, in addition to guiding a wind produced by the air blower 48 to one direction, a role as a visor member for preventing sunlight entering through the windshield 10 from entering the recess 22 through the blinding panel 40. Therefore, in an ordinary use state, it is darker in the recess 22 than in the vehicle compartment because the recess 22 is covered with the blinding panel 40 and no sunlight entering through the windshield 10 enters the recess 22. As a result, the air blower 48 is made even harder for the driver or a passenger to see.

Figure 3A:
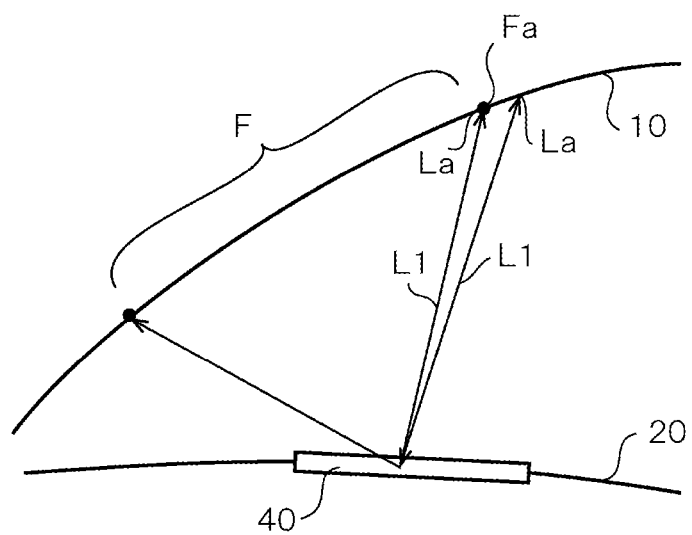
FIG. 3A illustrates how to determine inclination angles of perforations 41 of a blinding panel.
Figure 3B:
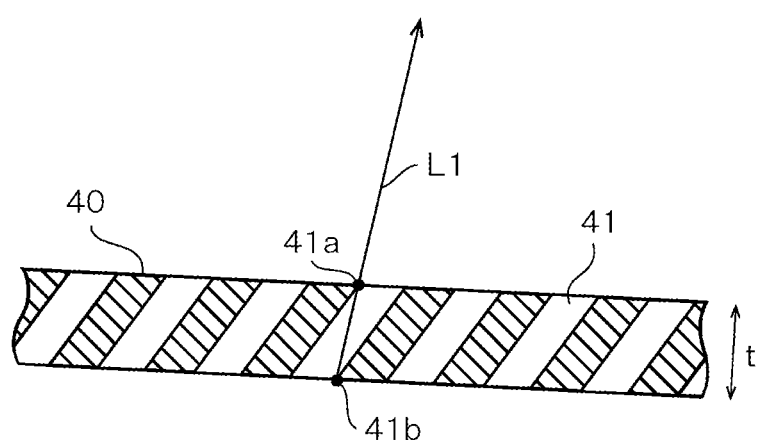
FIG. 3B is an enlarged sectional view of part of the blinding panel.

Next, the inclination angles of the perforations 41 will be described in detail. FIG. 3A illustrates how to determine inclination angles of the perforations 41, and FIG. 3B is an enlarged sectional view of part of the blinding panel 40. Assume a topmost point Fa of a region F, through which sunlight enters the vehicle compartment, of the windshield 10. Usually, the topmost point Fa coincides with the topmost point of the windshield 10. Also assume a windshield-side top end point 41a and a driver seat side bottom end point 41b of a perforation 41. A line connecting the bottom end point 41b and the top end point 41a of the perforation 41 is denoted by symbol L1, and a point where an extension of the line L1 intersects the windshield 10 is denoted by symbol La. It is desirable to set the inclination angle of the perforation 41 so that the intersecting point La is higher than the topmost point Fa. If the point La were located inside the region F, sunlight that passes through the region F would shine on the air blower 48 through the blinding panel 40.

The exemplary embodiment is directed to the case that the air blower 48 is disposed in the recess 22. In another case that a device having a light emitting device such as an LED light source is disposed in the recess 22, by designing the perforations 41 in the above-described manner, not only is the device hard for the driver or a passenger to see but also a phenomenon can be prevented that light emitted from the light emitting device produces reflection glare on the windshield 10.

The inclinations of the perforations 41 vary depending on the positional relationship between the windshield 10 and the perforation 41 and the orientation of the surface of the blinding panel 40 at the position of the perforation 41. For example, the inclination is large on the side close to the windshield 10 because the horizontal distance between the perforation 41 and the topmost point Fa is long there. That is, the perforations 41 are formed through the blinding panel 40 so that their inclination angle increases as the position goes from the driver seat side to the windshield 10 side. Where the inclination angle is varied from one perforation 41 to another, much time and labor are needed to form the perforations 41. In view of this, a measure may be taken that the numerous perforations 41 are grouped in advance and their inclination angle is varied in units of a group.

Figure 4:
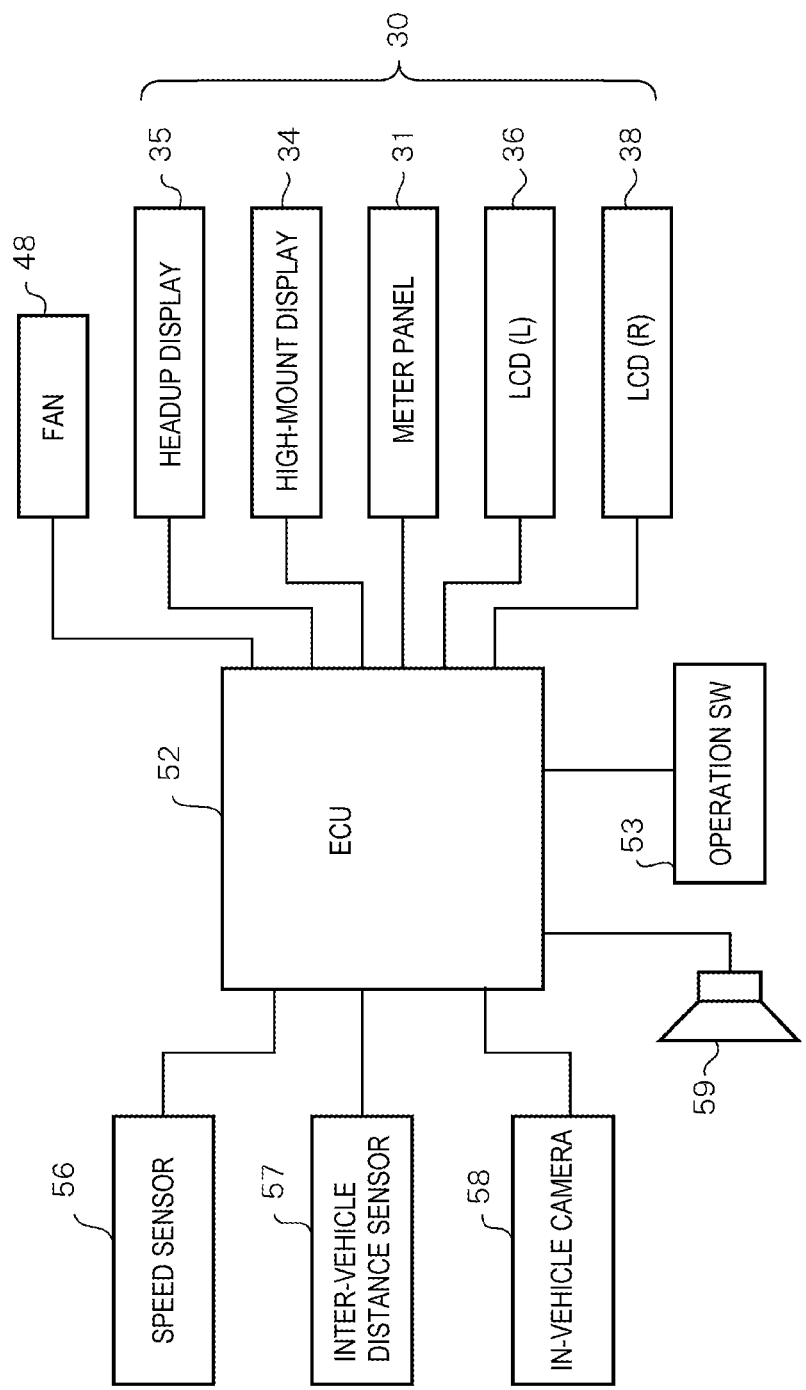
FIG. 4 shows a hardware configuration centered by a control device for controlling the in-vehicle unit.

FIG. 4 shows a hardware configuration centered by a control device 52 for controlling the in-vehicle unit 45 installed in the instrument panel 20. The control device 52 is an ECU (electronic control unit). In addition to the various displays 30 described above, the air blower 48, a speed sensor 56, an inter-vehicle distance sensor 57, an in-vehicle camera 58, a speaker 59, an operation switch 53, etc. are connected to the control device 52. The speed sensor 56 detects a speed of the vehicle. The inter-vehicle distance sensor 57 measures a distance from a target object by transmitting and receiving infrared light and detects the vehicle's getting close to the target object. The inter-vehicle distance sensor 57 may be configured so as to detect the vehicle's getting close to a target object by analyzing images taken by a camera. A plurality of inter-vehicle distance sensors 57 may be provided so as to be able to detect getting close to not only a target object located ahead of or behind the vehicle but also a target object located on the left or right of the vehicle.

The in-vehicle camera 58 is arranged at an optional location to capture images of the inside of the vehicle compartment. The speaker 59 produces a sound such as drive information, a warning, music, etc. according to audio data that is output from the control device 52. The operation switch 53 is used for various kinds of inputs by the driver.

Figure 5A:
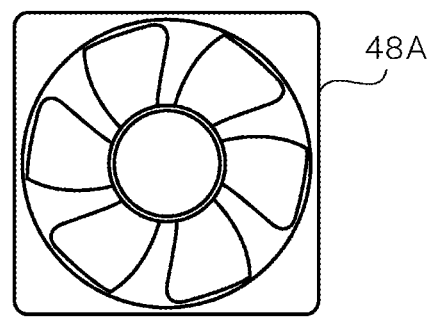
FIG. 5A shows an axial flow fan as an example air blower of the in-vehicle unit.
Figure 5B:
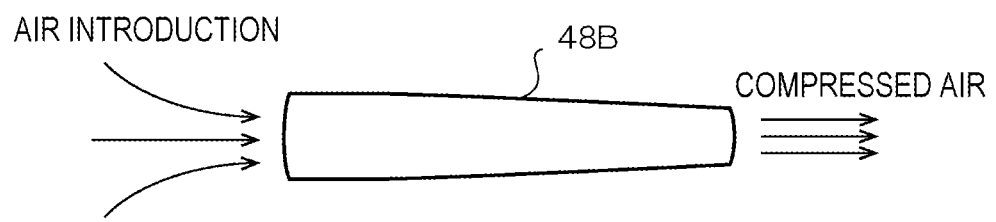
FIG. 5B shows a compressor as another example air blower.

FIGS. 5A and 5B show examples of the air blower 48. The air blower 48 may be a fan, a compressor, or the like. Examples of the fan are an axial flow fan and a sirocco fan. An example of the compressor is a blower fan. FIG. 5A shows an axial flow fan 48A as an example of the air blower 48. The axial flow fan 48A sends out air by rotating a plurality of blades and has a relatively small pressure ratio. FIG. 5B shows a compressor 48B as another example of the air blower 48. For example, the compressor 48B compresses air (introduced air) that is sucked through a rear suction inlet and discharges a spot wind (compressed air) through a front discharge outlet.

As mentioned above, the air blower 48 is housed in the recess 22 which is formed in driver seat side portion, located at a front-center position, of the instrument panel 20. The air blower 48 is thus disposed on the opposite side of the steering wheel 50 to the driver seat. Therefore, air sent from the air blower 48 is directed toward the face an area near the face of the driver through the space surrounded by the steering wheel 50.

Figure 6:
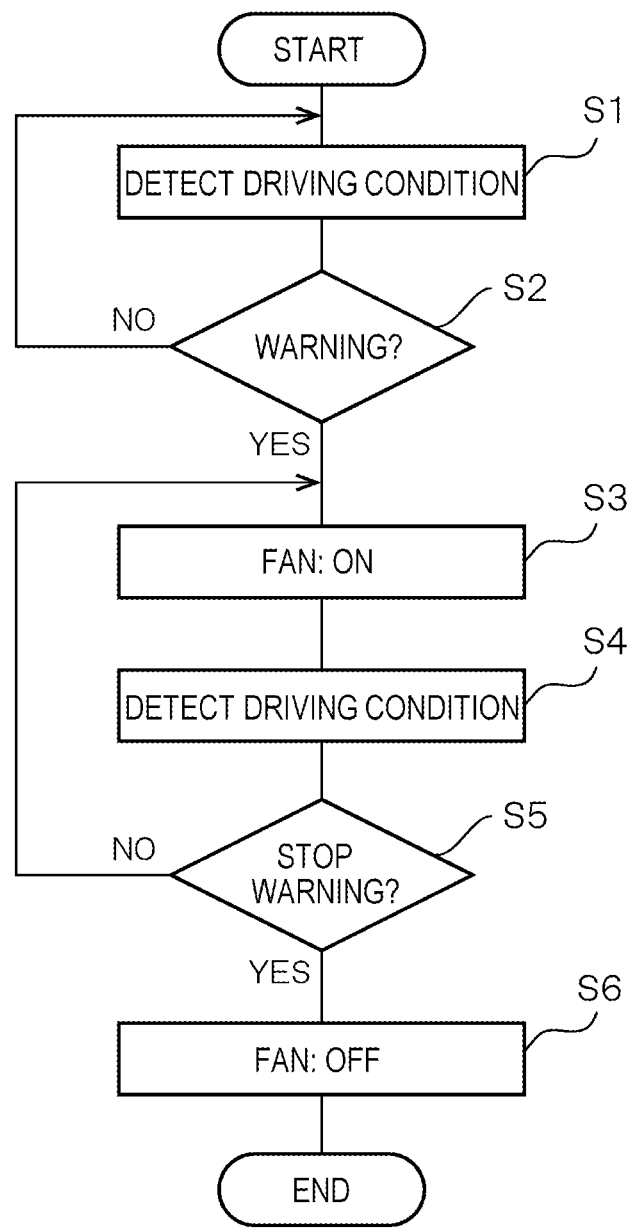
FIG. 6 is a flowchart of an example of a warning operation.

How the above-configured in-vehicle unit 45 operates will be described below. FIG. 6 is a flowchart showing the procedure of a warning process. At step S1, the ECU 52 detects a driving state of the vehicle using signals that are acquired from the speed sensor 56, the inter-vehicle distance sensor 57, etc. At step S2, the ECU 52 judges whether to perform a warning operation such as an attention arousing operation on the basis of the detected vehicle driving state. If the driving state is such as not to require a warning operation, the ECU 52 returns to step S1. An example driving state that requires a warning operation such as an attention arousing operation is a state that a speed detected by the speed sensor 56 is higher than a limit speed.

If it is judged at step S2 that a warning operation should be performed, at step S3 the ECU 52 performs a warning operation, that is, activates the air blower 48 to cause it to start sending a wind, which, as described above, hits the face or a portion near the face of the driver sitting on the driver seat through the space surrounded by the steering wheel 50. Receiving the air by his or her skin, the driver should become aware of the warning operation.

At step S4, the ECU 52 detects a vehicle driving state again. At step S5, the ECU 52 judges, based on the detection result, whether to continue the warning operation. If the driving state has not been improved and hence it is necessary to continue the warning operation, the ECU 52 returns to step S3.

On the other hand, if it is judged at step S5 that the driving state has been improved and the warning operation is no longer necessary, at step S6 the ECU 52 stops the driving of the air blower 48 to stop the sending air. Then the ECU 52 finishes the warning process.

In the in-vehicle unit 45, the air blower 48 sends air through the numerous perforations 41 formed through the blinding panel 40. The air sent through the blinding panel 40 hits the skin of the face of the driver through the space surrounded by the steering wheel 50. Feeling that the air is hitting the skin of the face, the driver would be alarmed by the unexpected event and become aware of the warning operation.

As described above, by hitting the face or a portion near the face of the driver with a wind, it is possible to alarm the driver to cause the driver to become aware of a warning operation. Since the in-vehicle unit 45 is installed in the instrument panel 20 and hence the air blower 48 is concealed behind the blinding panel 40, a good appearance of the instrument panel 20 can be ensured. Furthermore, the exemplary embodiment makes it easier to warn, for example, arouse attention of, the driver and the driver would come to drive safely. As such, the exemplary embodiment contributes to safe driving.

In the exemplary embodiment, at step S3, the air flow is kept constant. However, the air flow may be strengthened to raise the level of warning when a certain period of time elapses from the start of sending of the wind. In the exemplary embodiment, the air that is sent from the air blower 48 has the same temperature as the air in the vehicle compartment. However, when an air conditioner is in operation, cool air from the air conditioner may be used. Alternatively, air heated a heater or the like may be sent. In this manner, the driver would be alarmed even more and recognize the warning operation.

Figure 7A:
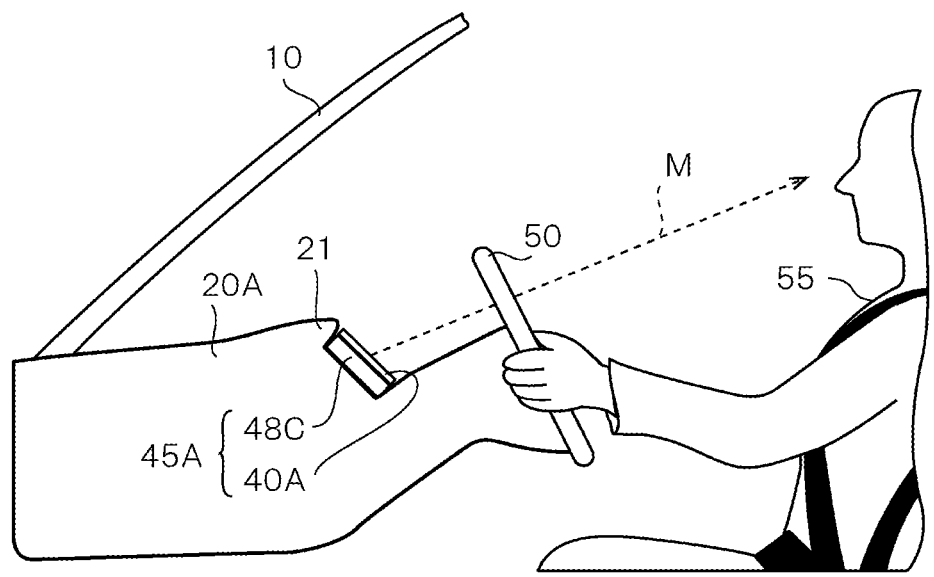
FIG. 7A is a side view of a driver seat side of a vehicle compartment, illustrating an instrument panel and its peripheral area according to another exemplary embodiment of the present invention.

FIG. 7A is a side view of a driver seat side of a vehicle compartment, illustrating an instrument panel 20A and its peripheral area according to another exemplary embodiment of the present invention. A front, driver seat side of the instrument panel 20A is formed with a meter hood 21.

Unlike in the foregoing exemplary embodiment, the front wall of the instrument panel 20A is not formed with a recess. An in-vehicle unit 45A is configured such that a blinding panel 40A is attached to the front surface of an air blower 48C, that is, integrated with the air blower 48C. The inclination angles of perforations 41A that are formed through the blinding panel 40A are set in the same manner as described above, that is, such that sunlight entering through the windshield 10 does not shine on the air blower 48C and such that the air is guided toward the face or an area near the face of the driver.

Figure 7B:
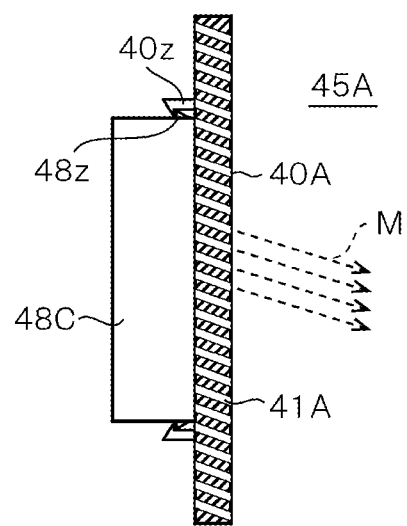
FIG. 7B is a sectional view of an in-vehicle unit shown in FIG. 7A.

FIG. 7B is a sectional view showing the configuration of the in-vehicle unit 45A. The in-vehicle unit 45A is configured such that the blinding panel 40A is fixed to the front surface of the air blower 48C. For example, the blinding panel 40A is fixed to the front surface of the air blower 48C by hooking hook portions 40z that project from the rear surface of the blinding panel 40A on respective lock counterpart portions 48z that are formed on side surfaces of the air blower 48C. Alternatively, the front surface of the air blower 48C may be fixed to the rear surface of the blinding panel 40A by inserting male screws into screw holes formed through a flange of the air blower 48C and female screws formed in the back side of the blinding panel 40A. The fixing method is not limited to any method.

An in-vehicle device according to another exemplary embodiment of the present invention is configured as an in-vehicle unit having an air blower and an in-vehicle camera.

Figure 8A:
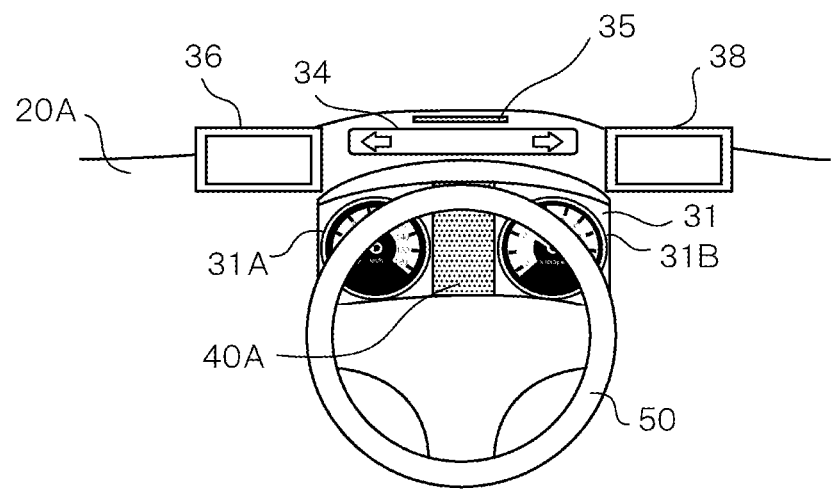
FIG. 8A is a front view illustrating a driver seat side of an instrument panel and its peripheral area according to another exemplary embodiment of the present invention.
Figure 8B:
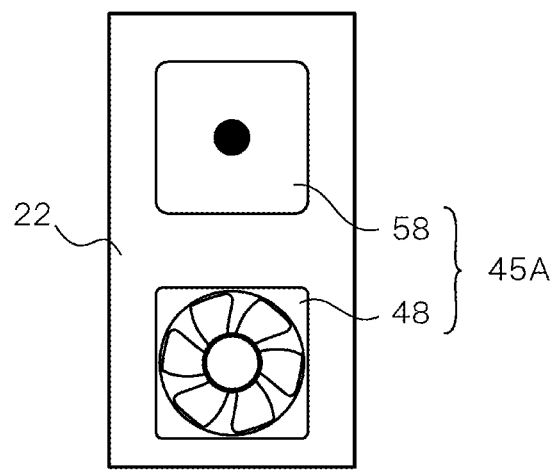
FIG. 8B shows an arrangement of an in-vehicle camera and an air blower which are housed in a recess whose opening is covered with a blinding panel shown in FIG. 8A.

FIG. 8A is a front view showing an appearance of a vehicle instrument panel 20A according to this exemplary embodiment. Units and devices that are installed in and around the driver seat side of the instrument panel 20A are the same as in the exemplary embodiment shown in FIG. 1, and the same or similar elements are given the same reference signs and description thereof will be omitted. FIG. 8B shows an arrangement of an in-vehicle camera 58 and an air blower 48 which are housed in a recess 22 whose opening 22a is covered with a blinding panel 40A.

The in-vehicle unit 45A has the in-vehicle camera 58 and the air blower 48. The in-vehicle camera 58 is arranged and configured to capture images a face of the driver sitting on the driver seat and its peripheral area through the blinding panel 40A and the steering wheel 50. The air blower 48 has the same configuration as and is similar in the manner of disposition to that used in the foregoing exemplary embodiment. The imaging range of the in-vehicle camera 58 is not limited to the face of the driver and its peripheral area but may be set according to a use.

In the in-vehicle unit 45A, the in-vehicle camera 58 and the air blower 48 are used in performing a warning operation such as an attention arousing operation. The hardware configuration centered by the control device 52 is the same as shown in FIG. 4.

Figure 9:
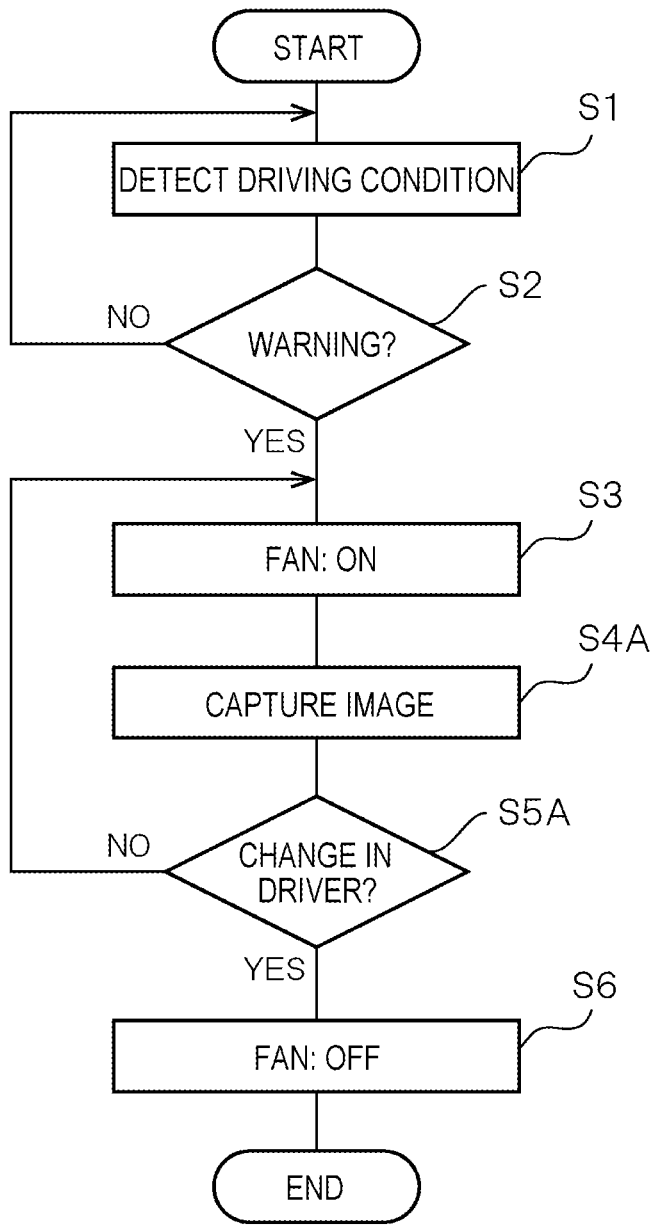
FIG. 9 is a flowchart of another example of a warning operation.

FIG. 9 is a flowchart showing the procedure of a warning process. Steps having the same ones in the flowchart of FIG. 6 are given the same reference signs as the latter and descriptions therefor will be omitted. Only different steps will be described below.

After activating the air blower 48 and causing it to start sending air toward the face of the driver at step S3, at step S4A the ECU 52 captures an image of the face of the driver and its peripheral area using the in-vehicle camera 58. At step S5A, the ECU 52 judges whether or not a change has occurred in the driver.

For example, whether or not the line of sight of the driver is making a movement that is necessary for improvement of the driving state is judged using a known line-of-sight detecting technique. For example, when a warning operation is being performed as a result of detection of an excessive speed, whether or not a change has occurred in the driver is judged by checking whether his or her line of sight has been directed to the speedometer a certain number of times or for a certain period of time since the start of sending air at step S3.

If it is judged at step S5A that no change has occurred in the driver, the ECU 52 returns to step S3. On the other hand, if it is judged that a change has occurred in the driver, at step S6 the ECU 52 turns off the air blower 48 to stop sending the air.

In the in-vehicle unit 45A, after the air blower 48 has started to send air through the blinding panel 40A, the in-vehicle camera 58 captures an image of the face of the driver and its peripheral area through the blinding panel 40A. The air hits the face of the driver through the blinding panel 40A and the space surrounded by the steering wheel 50. Feeling that the air is hitting the skin of his or her face etc., the driver would be alarmed by the unexpected event and become aware of the warning operation.

As described above, by virtue of the cooperative operations of the air blower 48 and the in-vehicle camera 58, it is possible to cause the driver to become conscious of a warning operation. Furthermore, since the in-vehicle unit 45A is installed in the instrument panel 20A and hence the air blower 48 and the in-vehicle camera 58 are concealed behind the blinding panel 40A, a good appearance of the instrument panel 20A can be ensured.

While a warning operation is being performed, a face image of the driver may be displayed on a display; sudden display of the face image on the display as part of the warning operation would serve as an impact on the driver.

The in-vehicle unit 45A may be equipped with only the in-vehicle camera 58 as a functional unit. For example, a warning operation may be performed using the in-vehicle camera 58 such that, as described above, an image of the face etc. of the driver taken by the in-vehicle camera 58 is displayed on a particular display. Capturing images may be performed merely for the purpose of crime prevention.

In this exemplary embodiment, the air blower 48 and the in-vehicle camera 58 which are concealed behind the blinding panel 40A are installed in the driver seat side portion, opposed to the steering wheel 50, of the instrument panel 20A. However, their installation location of the air blower 48 and the in-vehicle camera 58 is not limited, and may be installed in a portion, at the center in the vehicle width direction, of the instrument panel 20A or a portion in front of the front passenger seat, in which case the air blower 48 and the in-vehicle camera 58 also perform respective operations toward the driver seat.

Although in this exemplary embodiment the air blower 48 is used for a warning operation, the invention is not limited to such a case; the air blower 48 may operate as an air conditioner for adjusting the temperature in the vehicle compartment. For example, an aroma emitting device which emits an aroma may be installed as a functional unit of the in-vehicle unit 45A.

An in-vehicle camera system 5 according to exemplary embodiments of the present invention will be described below with reference to FIGS. 10 to 14C.

Figure 10:
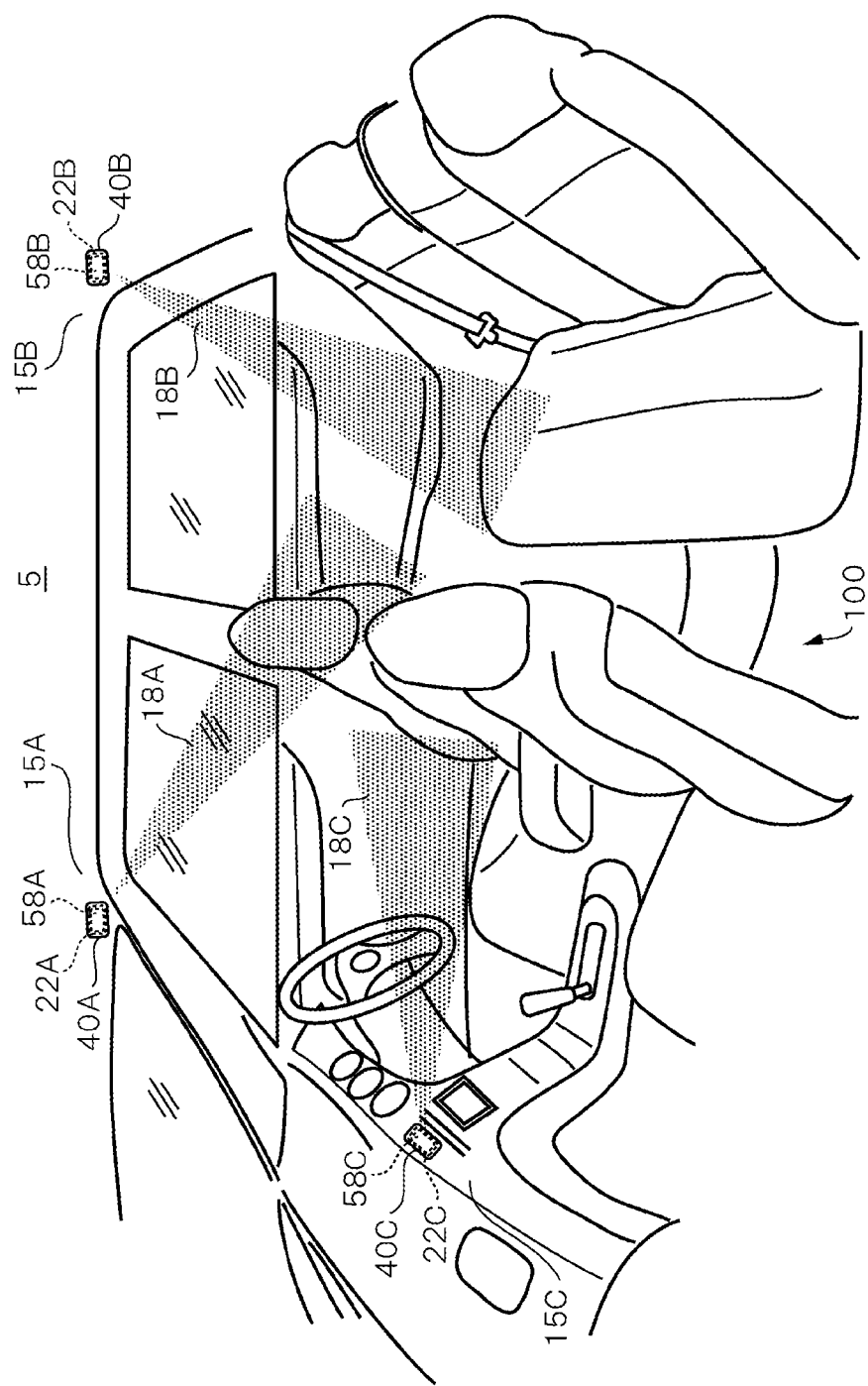
FIG. 10 is a view illustrating an appearance of a vehicle compartment in which a vehicle interior camera system according to an exemplary embodiment of the present invention is installed.

FIG. 10 shows an appearance of a vehicle compartment in which the vehicle interior camera system 5 is installed. Cameras of the vehicle interior camera system 5 are attached to a wall lining (trims 15) of a vehicle compartment 100 at a plurality of locations (three in the illustrated example). The trims form inner walls of the vehicle compartment.

Figure 12A:
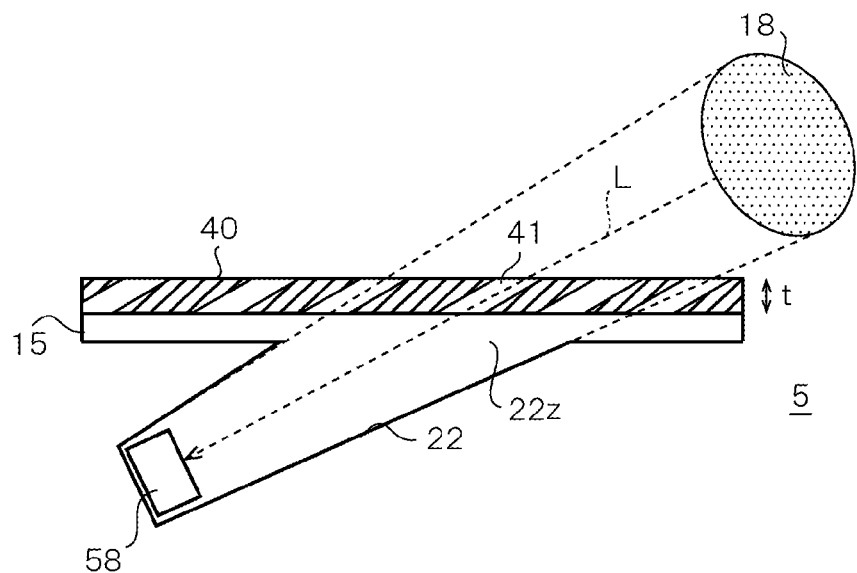
FIGS. 12A to 12C illustrate examples of perforations of blinding panels.

As shown in FIG. 12A, the vehicle interior camera system 5 includes a plurality of cameras 58 housed in respective recesses 22 formed in the trims 15 and a plurality of blinding panels 40 attached so as to cover openings 22z of the recesses 22 respectively.

Numerous perforations 41 are formed to extend through each blinding panel 40 from one side to the other side of the blinding panel 40. Each camera 58 takes an image of a certain range of the vehicle compartment 100 by receiving light (a light image) that is incident from the vehicle compartment 100 through the numerous perforations 41 of the associated blinding panel 40.

FIG. 10 shows a case that three cameras 58 are installed. Having an imaging device (CCD sensor or a MOS image sensor) on the front surface, each of the three cameras 58 converts an optical image that is formed by light incident thereon through a lens into an electrical signal, performs signal processing on it, and outputs a resulting imaging signal.

Among the three cameras 58, a camera 58A, which has an imaging range 18A that extends from a top-front-right location of the vehicle compartment 100 to over the rear seats, is housed in a recess 22A that is formed in a trim 15A located obliquely above the driver seat and is covered with a blinding panel 40A. A camera 58B, which has an imaging range 18B that extends obliquely downward from obliquely above the right-hand rear seat, is housed in a recess 22B that is formed in a trim 15B located obliquely above the right-hand rear seat and is covered with a blinding panel 40B. A camera 50C, which has an imaging range 18C that extends from between the driver seat and the front passenger seat to the rear seats, is housed in a recess 22C that is formed in a trim 15C, located at the center in the vehicle width direction, of the instrument panel and is covered with a blinding panel 40C. Although in this exemplary embodiment the three cameras 58A-58C are installed, it goes without saying that four or more cameras may be installed. Where the cameras 58A-58C need not be discriminated from each other, they will merely be referred to as cameras 58 generically (or a singular, representative term "camera 58" may be used). Generic terms "recesses 22," "trims 15," "imaging ranges 18," and "blinding panels 40" will also be used.

Figure 11A:
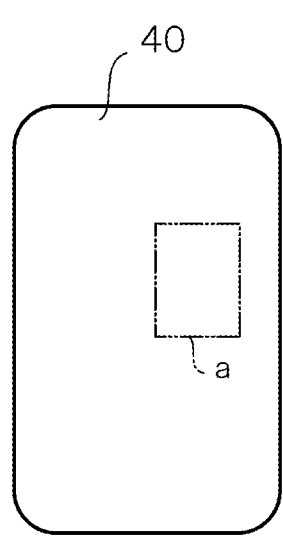
FIG. 11A is a front view of a blinding panel of the vehicle interior camera system shown in FIG. 10.

FIG. 11A is a front view of the blinding panel 40. The blinding panel 40 is shaped or molded so as to have such an external shape as to cover an opening 22z of the recess 22 formed in the trim 15 which is provided in the vehicle compartment 100. For example, the blinding panel 40 is fixed to a portion, around the opening 22z, of the trim 15 using screws, dedicated metal fittings, or adhesive or by fitting. When the blinding panel 40 is thus fixed, the surface of the blinding panel 40 becomes flush with that of a portion, around the blinding panel 40, of the trim 15 and they form a flat surface together.

Figure 11B:
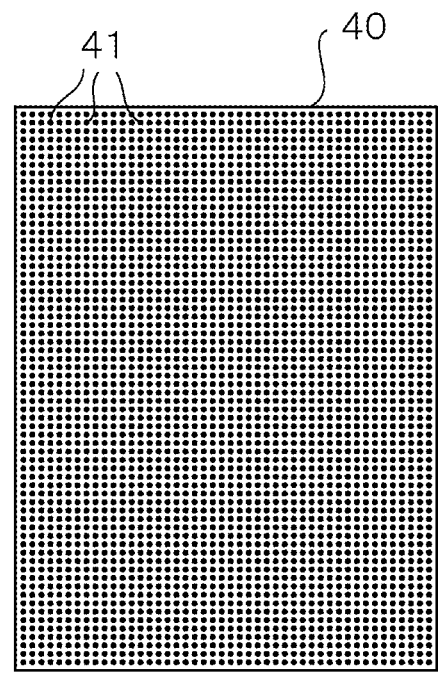
FIG. 11B is an enlarged view of a region "a" of the blinding panel shown in FIG. 11A.

Whereas the blinding panel 40 is typically formed by shaping a metal material of aluminum, stainless steel, or a certain alloy, it may be formed by molding a resin material such as acrylic or fiber-reinforced plastic. FIG. 11B is an enlarged view of a region "a" of the blinding panel 40. Numerous circular perforations 41 are formed through the blinding panel 40.

Figure 12B:
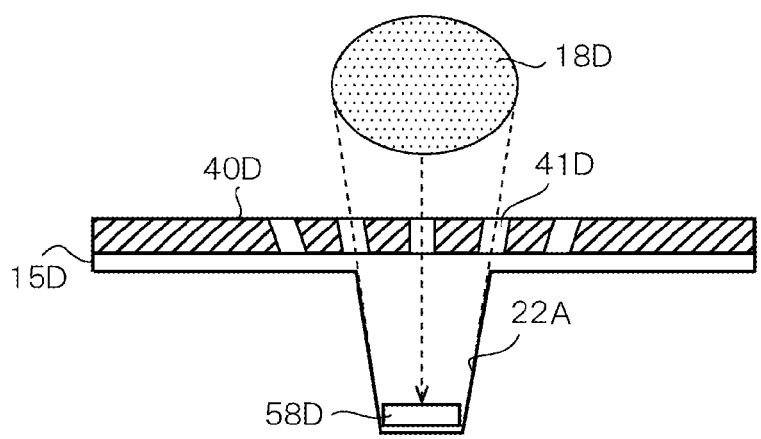
Figure 12C:
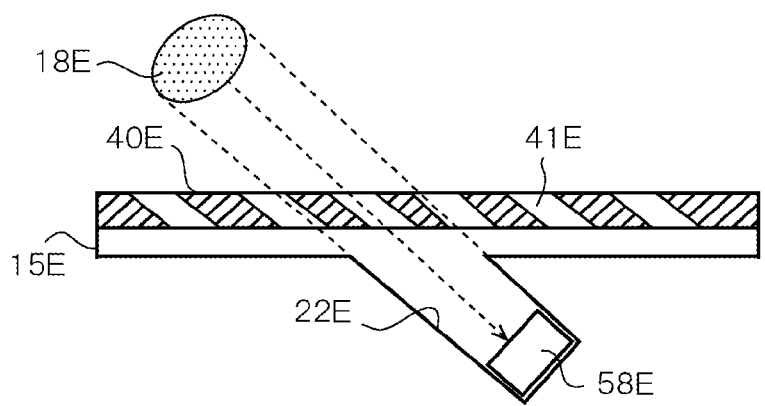

FIGS. 12A to 12C illustrate examples of perforations 41 of blinding panels 40. In the example of FIG. 12A, the camera 58 is disposed on the bottom surface of the recess 22 which extends obliquely from the surface of the trim 15 provided in the vehicle compartment 100. In FIGS. 12A to 12C, the members are drawn schematically to facilitate understanding of the description. External light L that is incident from the vehicle compartment 100 passes through the perforations 41 and travels in the inclination direction of the recess 22. That is, the axial lines of the respective perforations 41 are inclined with respect to the thickness direction "t" of the blinding panel 40 so that light coming from the imaging range 18 in the vehicle compartment 100 passes through the perforations 41.

The inclination angle of the perforation 41 of the blinding panel 40 varies depending on its positional relationship with the camera 58. In other words, the perforations 41 are inclined by different angles from the thickness direction of the blinding panel 40 according to corresponding positions in the imaging range 18, respectively.

In the example of FIG. 12B, a camera 58D is disposed on the bottom surface of a recess 22D which extends perpendicularly from the surface of a trim 15D provided in the vehicle compartment 100. In this example, the inclination angles of perforations 41D are generally small and, in particular, are equal to 0° around the center.

In the example of FIG. 12C, a camera 58E is disposed on the bottom surface of a recess 22E which extends obliquely from the surface of a trim 15E at a large inclination angle. In this example, the inclination angles of perforations 41E are generally large so that light coming from a relatively narrow imaging range 18E passes through the perforations 41E. In this case, the camera 58E is not seen through the perforations 41E from the direction that is perpendicular to the blinding panel 40E which covers the opening of the recess 22E (i.e., from right over the blinding panel 40E in FIG. 12C).

The structures of the blinding panel 40, 40D and 40E shown in FIGS. 12A to 12C are just examples, and the inclination angles of the perforations 41 are set according to the orientation of the blinding panel 40 and the position of the imaging range 18. As described in the example of FIG. 12B, the inclination angles include 0°.

As described above, in the vehicle interior camera system 5, since the camera 58 is disposed on the bottom surface of the recess 22 which is formed in the trim 15 provided in the vehicle compartment 100, the blinding panel 40 which is attached to the trim 15 so as to cover the opening of the recess 22 makes the camera 58 less viewable. Since the recess 22 extends obliquely from the surface of the trim 15, the camera 58 is not seen from the direction that is perpendicular to the blinding panel 40. Furthermore, it is darker in the recess 22 than in the vehicle compartment 100 because the recess 22 is covered with the blinding panel 40, which is another factor in causing the camera 58 (concealed behind the blinding panel 40) less viewable from the driver or a passenger.

For example, even if a camera 58 is installed in a trim 15 that is located close to a door, since the camera 58 is not exposed from the trim 15, the driver or a passenger less likely recognizes the presence of the camera 58 which is concealed behind the blinding panel 40 even if he or she looks at the blinding panel 40. Thus, the probability is low that the driver or a passenger sees the installed camera 58 and thereby feels uncomfortable or pressured.

Not causing the driver or a passenger to feel uncomfortable or pressured, a number of cameras 58 can be installed in the vehicle compartment 100, which enhances the crime prevention of the vehicle compartment 100. That is, although the cameras 58 are installed in the vehicle compartment 100, a similar atmosphere as in ordinary vehicle compartments can be created.

As described above, in the vehicle interior camera system 5 according to the exemplary embodiment, the driver or a passenger is less likely to notice the presence of the cameras 58 installed in the vehicle compartment 100, lowering the probability that they cause the driver or a passenger to feel uncomfortable or pressured.

With the camera 58 housed in the recess 22 that is formed in a wall of the vehicle compartment 100, it is possible to make the surface of the blinding panel 40 flush with that of the trim 15 and thereby form a smooth wall surface there. With this measure, the driver or a passenger is even less likely to notice the presence of the camera 58 and the design performance of the vehicle compartment 100 can be enhanced.

Furthermore, by properly setting the directions of the perforations 41 of the blinding panel 40 (i.e., their inclination angles with respect to the thickness direction of the blinding panel 40), capturing images of unnecessary regions can be prevented, enabling protection of privacy.

Still further, since images of the rear seats can be taken from multiple angles by multiple cameras 58 installed in trims 15 at respective locations in the vehicle compartment 100 (including locations other than the instrument panel), the number of images is increased that can be used as evidential images at the occurrence of a crime in the vehicle compartment of a taxi, for example.

In the exemplary embodiment described above, each camera 58 is housed in the associated recess 22 that is formed in a trim 15 provided in the vehicle compartment 100 and the blinding panel 40 is fitted in (or attached to) a portion of the trim 15 around the opening 22z of the recess 22. In a camera unit 60 according to another exemplary embodiment of the present invention, a blinding panel is attached to the front surface of a camera so as to be integral with the camera.

Figure 13A:
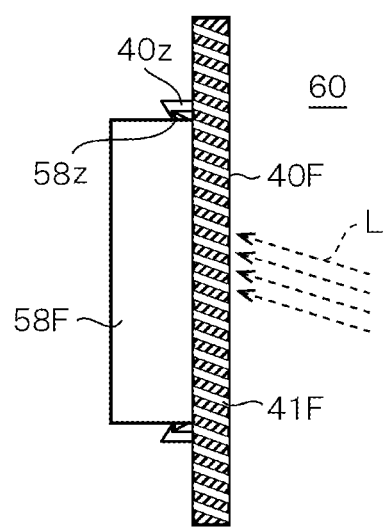
FIG. 13A is a sectional view of a camera unit according to another exemplary embodiment of the present invention.
Figure 13B:
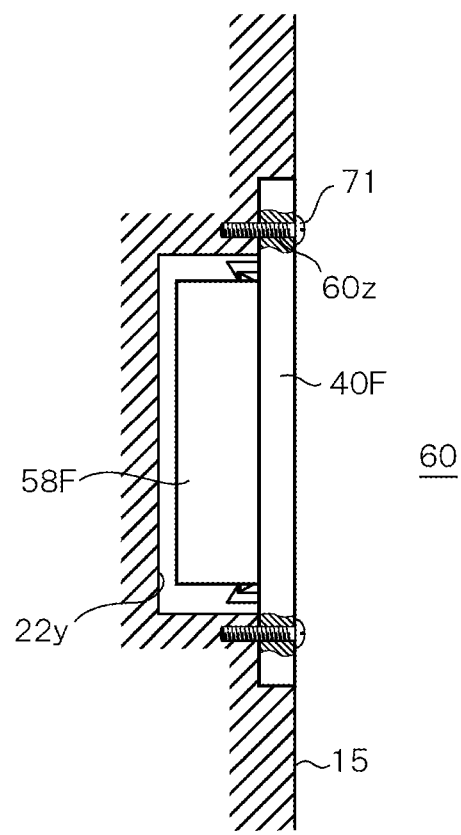
FIG. 13B is a view illustrating an example of attachment of the camera unit to a trim provided in a vehicle compartment.

FIGS. 13A and 13B show the configuration of the camera unit 60. FIG. 13A is a sectional view of the camera unit 60. The camera unit 60 is configured such that a blinding panel 40F is fixed to the front surface of a camera 58F. For example, the blinding panel 40F is fixed to the front surface of the camera 58F by hooking hooks 40z that project from the rear surface of the blinding panel 40F on respective lock counterpart portions 58z that are formed on side surfaces of the camera 58F. Alternatively, the front surface of the camera 58F may be fixed to the rear surface of the blinding panel 40A by inserting male screws into screw holes formed through a flange of the camera 58F and female screws formed in the back side (camera side) of the blinding panel 40F. The fixing method is not limited to any method.

A number of perforations 41F are formed through the blinding panel 40F. As in the previous exemplary embodiment, the perforations 41F are inclined with respect to the thickness direction of the blinding panel 40F so as to extend in incidence directions of light L coining from an imaging range.

FIG. 13B shows an example manner of attachment of the camera unit 60 to a trim 15 provided in the vehicle compartment. For example, the camera unit 60 is attached to a trim 15 that is located close to a door knob beside a rear seat. The trim 15 to which the camera unit 60 is attached is formed with a recess 22y for housing the rear portion of the camera unit 60. Although the recess 22y is not indispensable for the attachment of the camera unit 60, the formation of the recess 22y makes it possible to set the surface of the camera unit 60 flush with that of the trim 15 to form a flat surface there.

With the portion, projecting to the back side, of the camera unit 60 housed in the recess 22y, male screws 71 are inserted into screw holes 60z that are formed through a flange of the camera unit 60 and then engaged with female screws formed in the trim 15, whereby the camera unit 60 is fixed to the trim 15.

As described above, in the vehicle interior camera system according to this exemplary embodiment, each camera unit 60 is configured such that the camera 58F and the blinding panel 40F are integrated with each other, work of attaching the camera units 60 to trims 15 can be carried out easily. In particular, the recesses 22y that are formed in trims 15 can be so shallow as to facilitate boring work.

The camera units 60 can be made compact and, even if they are made compact, they can capture images in ranges that are determined in accordance with the inclination angles of the recesses 22y, respectively.

Not causing the driver or a passenger to feel uncomfortable or pressured, a number of camera units 60 can be installed in the vehicle compartment, which enhances the crime prevention of the vehicle compartment. That is, although the cameras 58F are installed in the vehicle compartment, a similar atmosphere as in ordinary vehicle compartments can be created by virtue of enhanced design.

Figure 14A:
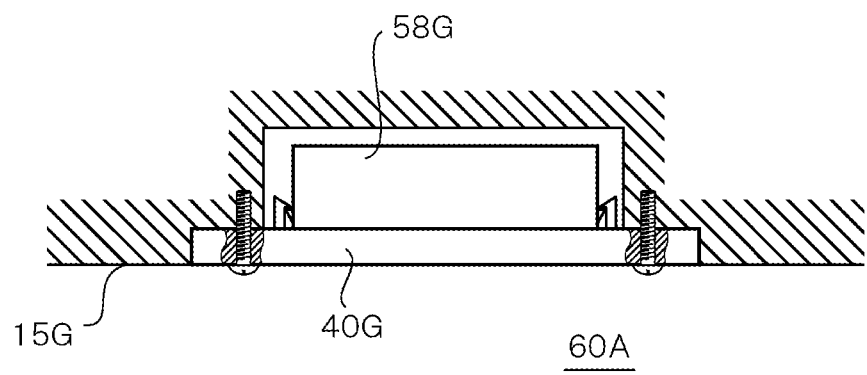
FIGS. 14A and 14B are views illustrating a camera unit according to another exemplary embodiment of the present invention.
Figure 14B:
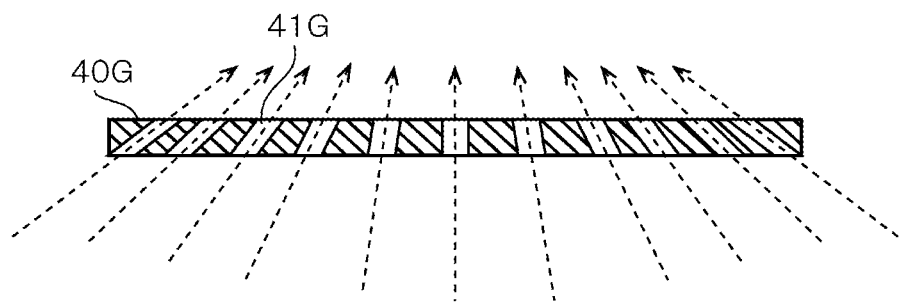

FIGS. 14A and 14B illustrate a camera unit 60A according to another exemplary embodiment of the present invention. The camera unit 60A is attached to a trim 15G of a ceiling portion of the vehicle compartment 100. FIG. 14A shows an attachment state of the camera unit 60A that is attached to the trim 15G of the ceiling portion. The method for attaching the camera unit 60A to the trim 15G is the same as in the previous exemplary embodiment.

FIG. 14B shows shapes of perforations 41G which are formed through a blinding panel 40G. The perforations 41G are formed so that light coming from an imaging range reaches the front surface of a camera 58G to which the blinding panel 40G is attached so as to be joined to the camera 58G. That is, the perforation 41G is inclined so as to have a larger inclination angle as the position goes outward from the center of the blinding panel 40G.

Configured in the above-described manner, the camera unit 60A can perform imaging with the entire vehicle compartment 100 being an imaging range like an omni-directional camera. The camera unit 60A can be set so as not to take images of a particular region of the vehicle compartment 100 by changing the inclination angles of perforations 41G corresponding to the particular region or forming no perforations corresponding to the particular region.

Although in the above exemplary embodiments the imaging range in a particular direction is fixed, a configuration is possible that the camera or each camera incorporates a zoom lens and the imaging range is varied by zooming-in or zooming-out. In this case, the imaging range can be enlarged or reduced by giving extra margins to the inclination angles of the respective perforations of the blinding panel.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. An in-vehicle device comprising:
a functional unit to be arranged at an instrument panel of a vehicle and configured to perform an operation toward a driver seat; and
a blinding panel covering a front surface of the functional unit,
wherein a plurality of perforations is formed in the blinding panel to extend through the blinding panel in a thickness direction of the blinding panel.

2. The in-vehicle device according to claim 1, wherein the perforations are inclined with respect to the thickness direction of the blinding panel to extend toward the driver seat.

3. The in-vehicle device according to claim 1, wherein the functional unit is configured to be housed in a recess formed in the instrument panel, and the blinding panel is configured to cover an opening of the recess.

4. The in-vehicle device according to claim 1, wherein the blinding panel is attached to the front surface of the functional unit so as to be joined to the functional unit.

5. The in-vehicle device according to claim 1, wherein the functional unit comprises an air blower configured to send air.

6. The in-vehicle device according to claim 1, wherein the functional unit comprises a camera configured and arranged to capture an image of a region inside a vehicle compartment.

7. The in-vehicle device according to claim 5, wherein the air blower is arranged at a location on the instrument panel that faces a steering wheel of the vehicle and is configured to send the air during a warning operation.

8. The in-vehicle device according to claim 7, wherein the functional unit further comprises a camera configured and arranged to capture an image of a region inside a vehicle compartment, and wherein the air blower and the camera operate in cooperation with each other during the warning operation.

9. A vehicle interior camera system configured to capture an image of an inside of a vehicle compartment, the vehicle interior camera system comprising:
- at least one camera installed in a wall of the vehicle compartment; and
- at least one blinding panel covering a front surface of the camera,
- wherein a surface of the blinding panel forms a part of a surface of the wall, and
- a plurality of perforations is formed in the blinding panel to allow light that comes from an imaging range of the camera toward the front surface of the camera to pass through the perforations.

10. The vehicle interior camera system according to claim 9, wherein the at least one camera comprises a plurality of cameras, and the at least one blinding panel comprises a plurality of blinding panels covering the respective front surfaces of the cameras.

11. The vehicle interior camera system according to claim 9, wherein the camera is housed in a recess formed in the wall, and the blinding panel covers an opening of the recess.

12. The vehicle interior camera system according to claim 9, wherein the blinding panel is attached to the front surface of the camera so as to be joined to the camera.

13. The vehicle interior camera system according to claim 9, wherein the perforations are formed such that an axial line of each of the perforations is inclined in a direction defining the imaging range.

14. The vehicle interior camera system according to claim 9, wherein the camera is installed such that the imaging range covers an area of a rear seat inside the vehicle compartment.

15. The in-vehicle device according to claim 2, wherein an inclination angle of each of the perforations with respect to the thickness direction of the blinding panel is such that sunlight passing through a windshield of the vehicle does not directly shine on the functional unit through the perforations.

16. The in-vehicle device according to claim 15, wherein the perforations comprise a first perforation and a second perforation, the first perforation being disposed between the windshield and the second perforation, and the second perforation being disposed between the first perforation and the driver seat, and
- wherein the inclination angle of the first perforation is greater than the inclination angle of the second perforation.

17. The vehicle interior camera system according to claim 9, wherein the surface of the blinding panel and the surface of the wall are flush with each other.

* * * * *